United States Patent [19]
Jahrsetz et al.

[11] Patent Number: 5,699,685
[45] Date of Patent: Dec. 23, 1997

[54] CENTRAL LOCK SYSTEM FOR AN AUTOMOTIVE VEHICLE WITH SATELLITE PROCESSORS AT RESPECTIVE LOCKS

[75] Inventors: Achim Jahrsetz, Velbert; Frank Kleefeldt, Heiligenhaus; Wilfried Ostermann, Essen; Fred Welskopf, Herne, all of Germany

[73] Assignee: Kiekert AG, Heiligenhaus, Germany

[21] Appl. No.: 650,136

[22] Filed: May 17, 1996

[30] Foreign Application Priority Data

Aug. 18, 1995 [DE] Germany ................ 195 30 720.8

[51] Int. Cl.⁶ ................ E65B 49/00; B60R 25/00
[52] U.S. Cl. ................ 70/264; 70/278; 307/10.2; 180/287; 340/825.37
[58] Field of Search ................ 70/264, 278, 262, 70/263; 307/10.2–10.6; 180/287; 340/825.31, 825.32, 825.54

[56] References Cited

U.S. PATENT DOCUMENTS

| | | | |
|---|---|---|---|
| 4,494,114 | 1/1985 | Kaish | 340/825.31 |
| 4,895,009 | 1/1990 | Kleefeldt | 70/264 |
| 5,229,648 | 7/1993 | Sues | 307/10.2 |
| 5,486,812 | 1/1996 | Todd | 70/264 |
| 5,534,846 | 7/1996 | Kuroda | 70/264 |

FOREIGN PATENT DOCUMENTS

| | | | |
|---|---|---|---|
| 4003580 | 8/1991 | Germany | 70/264 |
| 41 41 504 | 12/1991 | Germany . | |
| 44 28 947 | 4/1996 | Germany . | |
| 2226847 | 7/1990 | United Kingdom | 70/264 |
| 2227791 | 8/1990 | United Kingdom | 70/264 |

*Primary Examiner*—Flemming Saether
*Attorney, Agent, or Firm*—Herbert Dubno

[57] ABSTRACT

A centralized lock system for a motor vehicle, provided with a system-specific identity code word which is stored in memories of the satellite processors associated with the door locks as well as in the code word storage memory of the central processor and the code words are transmitted back and forth along the base or line connecting the electronic controller with the door locks. An identity test is effected at these memories and upon failure of the identity test, the door lock and/or electronic controller or all of the door locks and preferably also the electronic controller are deactivated. This prevents ready replacement of the components since the system will not recognize a foreign component and deactivation will occur upon an attempt to substitute a foreign component for one of the original family of components of the system.

18 Claims, 2 Drawing Sheets

CENTRAL LOCK SYSTEM FOR AN AUTOMOTIVE VEHICLE WITH SATELLITE PROCESSORS AT RESPECTIVE LOCKS

FIELD OF THE INVENTION

Our present invention relates to a central lock system for an automotive vehicle and, more particularly, to a central lock system of the type in which an electronic controller with a central processor can be connected to a plurality of door locks, each of which can have a respective satellite processor.

BACKGROUND OF THE INVENTION

Central locking systems for motor vehicles are known in which the electronic controller of the vehicle has a central processor connected by a control line to the door locks which, in turn, can be provided with satellite processors.

The control system serves to operate the door locks. The control device can be used for the service and monitoring of other functions of the automotive vehicle and other components thereof, for example, to control the internal lighting, to control a shiftable roof, to control the windows, to regulate mirror setting, to adjust seat positions and/or to control the positions of a convertible roof or the like. For this purpose the electronic controller may be a computer with microprocessors or the like.

Utilizing such an electronic controller, various control functions can be regulated in association with the entry into the vehicle or the departure from the vehicle of a particular individual for which those functions may be preprogrammed.

Apart from the door locks, electrical activation by the control system can be provided, if desired, for the engine hood lock, the trunk lock, a rear door lock, a glovecompartment lock or a fuel tank lock. Programmed operation of all of these locks can be integrated into the central control system, as well. Actuation of the central controller can be effected by a wired system, i.e. by switches wired into the control device or by a wireless system utilizing communication between a portable wireless operating device (e.g. a transponder carried by the driver) and the controller. The central processor, moreover, can be programmed to carry out a variety of tasks and to operate the locks, for example, in response to a number of stimuli or to respond to different inputs.

The electrically-controlled door locks usually have mechanical elements like a rotary bolt and a keeper system which can be associated with a variety of levers. The keeper and levers may be operated by electrically-controlled setting elements to bring about various lock positions and functions. Electrically-controlled setting elements may result in mechanical translation or rotation of the parts to which they are connected and allow all of the customary functions of the door locks to be met, including "open", "locked", "unlocked", "theft security off" and "theft security on", and "child safety off" and "child safety on."

These functions can be achieved mechanically by operation of various actuating elements on the vehicle door and, alternatively, electrically by the setting elements. From a safety point of view and as a protection against theft, it is advantageous to so arrange the door locks so that they only can be mechanically opened via actuation of an internal actuating handle.

Central locking systems of the aforedescribed type are known, for example, from German patent document 41 41 504. With this central locking system, however, it is a drawback that one or all of the door locks and/or the controller can be replaced by an unauthorized individual such as a thief or a receiver of the stolen automobile, for example, following a theft of the vehicle. Such unauthorized replacement can even be effected when the central locking system must respond to a code transmitted from a remote source and that code may be unknown to the unauthorized individual in possession of the vehicle. In that case a replacement allows restoration of all of the functions to the central lock system without a significant cost in refitting the stolen vehicle

OBJECTS OF THE INVENTION

It is the principal object of the present invention, therefore, to provide a central lock system which will reduce the ease with which a central lock system can be restored to operation by an unauthorized individual, e.g. after theft of a vehicle.

Another object of the invention is to increase the versatility of a central lock system for a motor vehicle so as to reduce the likelihood of theft and, in the case of theft, to make more inconvenient restoration of the vehicle to full operability.

Still another object of the invention is to provide an improved centralized lock system without drawbacks of earlier systems.

SUMMARY OF THE INVENTION

These objects are attained, in accordance with the invention in a central lock system for an automotive vehicle having an electronic controller with a central processor having a memory for a controller identity code word. Each of the door locks has a satellite processor with respective lock identity code word storage or memory and at least one electrical control line connects the satellite processor with the central processor, this control line forming a bus. The system operates in normal use of the lock system as described in German patent document 41 41 504.

According to the invention, in the lock identity code word store or memory and in the controller identity code word storage or memory, a system-specific identity code word specific to the central lock system itself, can be stored whereby the identity code words are repetitively transmitted back and forth over the control line and in a satellite processor and/or the central processor to which the identity code word is transmitted, an identity testing (comparison) is effected. Upon an identity failure (lack of match upon comparison) of a door lock and/or the control device, this door lock and/or the control device is deactivated.

An identity code word is simultaneously a characteristic family name for the principal components of a specific central lock system. A component foreign to the central lock system can thus be recognized by the identity test because it cannot transmit the system-specific identity code word along the bus or will transmit along the bus a different code word from the system-specific code word for which the identity test is made. The failure to match the identity code word of the foreign unit with the system-specific code word will bring about immediate inactivation of the system. The identity test can be a test for a complete match between the permanently stored identity code word and the transmitted identity code word. However, within the scope of the invention is a system in which an identity code word to be transmitted is first coded, then transmitted and thereafter decoded, whereupon the identity test is effected.

The transmission of the identity code word can be effected independently from the transmission of control signals, i.e. the signal for normal operation of the locks, or as components of these control signals. When the identity code word transmission is to be effected independently of the control signals, the identity code words can be transmitted back and forth along the bus periodically at any selected time interval programmed in the processors. For transmission of the identity code words, a separate line can be provided if desired. However, a single line system is preferred utilizing multiplexing and single line bus techniques. In that case, the single line or bus will carry both the identity code words and the control signals. The system-specific identity code word can, if desired, be attached to coded signals for normal lock operation.

When reference is made herein to permanent storage of the identity code words, we mean to indicate that the identity code words are stored and are read out for the identity test purposes and transmission without any change. The identity code words thus remain in memory even though they are transmitted. Of course that does not exclude a change code in which the identity code word is altered for all of the components of the central lock system, corresponding to a change of the family name for all of the components, periodically or at preprogrammed intervals or by re-initialization with the diagnostic device.

A satellite processor of the type with which the present invention is concerned can be integrated or built into the door lock so that it cannot be replaced or removed by itself.

The term "deactivation" is used here to indicate that the deactivated component of the central lock system will no longer respond to a control signal. This can be effected by completely and substantially irreversibly (until reactivation) removing the component from the electric current source. In the case of the controller, the deactivated controller will no longer respond to control signals from the operating switches, transponders or a remote control unit.

Preferably the door locks of the invention are electrically controlled door locks with a mechanical theft security facility. In this case, a failure of the identity test of a vehicle door can initially bring the door lock to its "theft security on" function or position and deactivate it. Of course, one need not establish the "theft security on" function if the door lock is already in this position when deactivation is to be effected. With this embodiment, an unauthorized individual attempting to change the door lock is compelled to break the latter or otherwise damage the vehicle to accomplish the replacement at least to a high degree of probability. This makes the likelihood of such replacement substantially less. The central lock system can be so equipped that, upon an identity test failure, all of the door locks will first be brought into the "theft security on" position and then deactivated.

According to another feature of the invention, both the central processor and the satellite processors can have identity control registers with the register content being "active" for normal lock operation and control functions of the central processor and satellite processors. When, however, the contents of the registers or one of them is changed to "inactive", the normal control functions are blocked. The contents of the identity control registers can be changed based upon the comparison of the identity code words, a comparison failure switching over from "active" to "inactive" in one or more registers.

The reactivation by an unauthorized individual can be precluded by programming the processors to erase the identity code word of a door lock or the central controller upon an identity failure in the respective memory or storage or upon replacement by a new identity code word from a random generator. With erasure of the identity code word, of course, unauthorized efforts to rectify the components is rendered more difficult if not impossible.

In an especially advantageous embodiment of the invention, the central controller has a diagnostic terminal to which a diagnostic device can be connected, the diagnostic device being of the type commonly used to diagnose faults in a motor vehicle. The diagnostic device can serve to initialize the identity control system and program the memories with the identity code word, reset the identity control registers and reactivate the components of the central lock system.

The central lock system of the invention can thus comprise:
- a plurality of electrically operated automotive vehicle door locks;
- an electronic controller for the locks and including a central processor and a code word storage memory operatively connected to the processor for storing a controller-identity code word;
- a respective satellite processor assigned to each of the locks and having a code word storage memory for a respective lock-identity code word;
- means for storing in each of the memories a system-specific identity code word specific to the centralized lock system;
- at least one electrical control conductor coupling the satellite processors with the central processor for controlling the satellite processors from the central processor and for back and forth transmission of the system-specific identity code word over the conductor between the central and satellite processors for effecting an identity test of a stored system-specific identity code word with a transmitted system-specific identity code word in at least one of the processors; and
- means at least the one of the processors for deactivating at least one of the electronic controller and of the door locks upon a failure of the identity test.

Within the scope of the invention is a method of operating a central lock system of the aforedescribed type, that method comprising the steps of:
(a) storing in each of the memories a system-specific identity code word specific to the centralized lock system by a diagnostic device;
(b) repetitively transmitting the system-specific identity code word over the line between the satellite processors and the central processor;
(c) effecting an identity test of a stored system-specific identity code word with a transmitted system-specific identity code word in at least one of the processors; and
(d) deactivating at least one of the electronic controller and of the door locks upon a failure of the identity test.

The system of the invention can have a theft-warning unit connected to the central processor whereby the door lock after triggering of the theft-warning system is deactivated. This additionally complicates the invasion of the motor vehicle by an unauthorized individual, limits the possibility that the vehicle will be transported away and makes further use of the vehicle more difficult.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
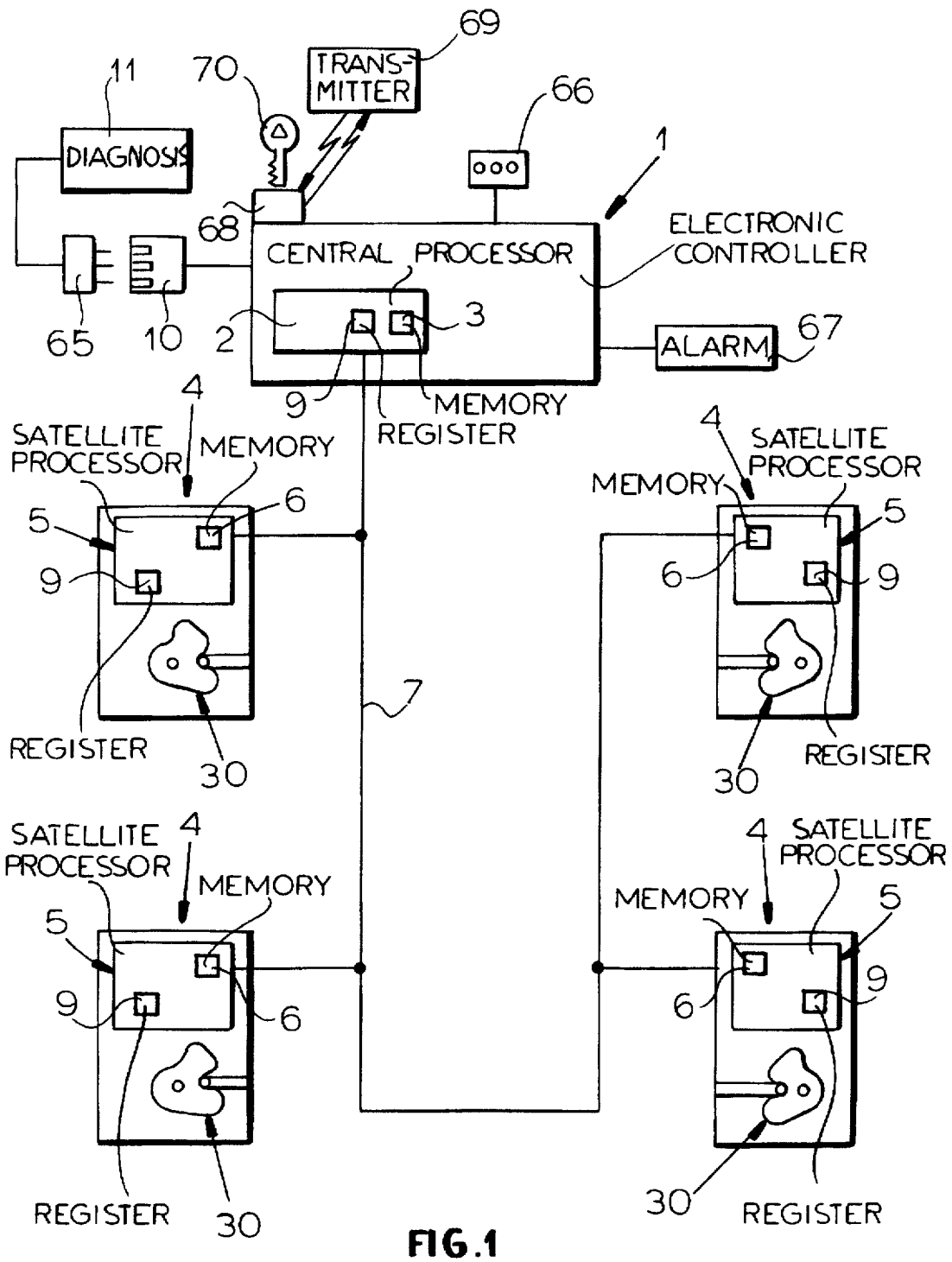
FIG. 1 is a schematic diagram of a centralized lock system according to the invention.

In FIG. 1 we have shown a centralized lock system which can comprise an electronic controller 1 for operating selectively or collectively, for electrically-controllable door locks 4 of a respective automotive vehicle. Each of the door locks 4 is provided on a respective vehicle door and it will be understood that additional locks can be provided for the vehicle hood, for the trunk, for a rear door, for a glove compartment, for the fuel tank cover or door and for other electrically-operated mechanisms of the vehicle like, for example, the windows, a sun roof, a convertible top, a sliding top or the like. The door locks 4 are connected via at least one control conductor or bus 7.

According to the invention, the electronic controller 1 comprises a central processor 2 which can have a memory 3 which can be referred to as a controller-identity code-word memory or storage. In addition, the central processor can have an identity control register 9.

Integrated in each door lock 4, i.e. built into the housing thereof, is a respective satellite processor 5 which has a respective lock-identity code storage or memory 6. In the embodiment shown, the electrical control conductor 7 is shown as a single-wire bus over which digital control pulses can be transmitted bidirectionally by multiplexing or the like. In this case, we can operate with pulse-width modulation. The reference to "control signals" is intended to include here also signals which are transmitted by sensors. Sensors of the type which can be used can include position-sensing switches, displacement, signalling pick-ups and the like. The satellite processors also can include identity control registers 9 as described for the electronic controller 1. For normal lock operations signals are transmitted from the controller to the locks to shift them into the selected or preprogrammed states.

In the lock-identity code word storage or memory 6 and in the controller-identity code word storage or memory 3, an identity code word specific to the central lock system is permanently stored. This identity code word is repetitively transmitted over the control line 7 and in one or more of the satellite processors 5 and/or in the central processor 2 to which the identity code word is transmitted, an identity testing is carried out. Upon a failure of the identity test, i.e. where the identity test fails to recognize the code word for the one of the vehicle door locks 4, and/or for the electronic controller 1, this door lock 4 and/or the control device 1 is deactivated.

Figure 2:
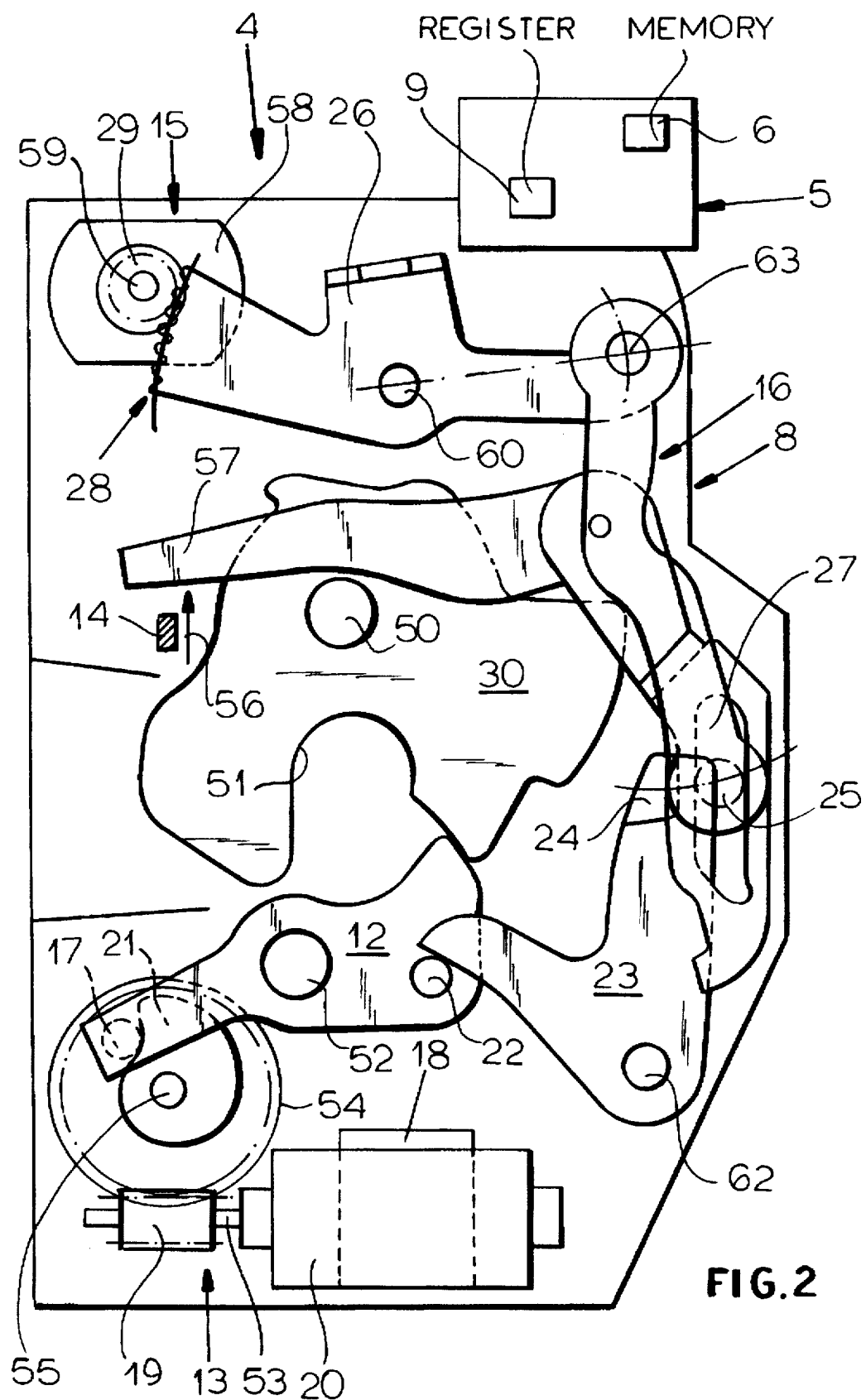
FIG. 2 is an illustration of a door lock showing diagrammatically the various levers, keepers, pawls and electrical operating mechanism for a door lock for use with the system of FIG. 1.

The lock mechanism at the door has been shown diagrammatically in FIG. 2 and can comprise a housing or support 8 on which a rotary door bolt 30 is rotatable on a pin 50 and can engage a pin or shaft on the door frame in its notch 51. That pin has not been shown in FIG. 2. The rotary bolt 30 cooperates with a locking pawl or keeper 12 which, in turn, is swingable on a pin 52. The rotary bolt 30 cooperates with the door bolt for locking of the vehicle door in the usual manner. The keeper 12, in turn, is electrically operable by an electrical positioning element 13 which can comprise an electric motor 18 whose worm gearing 20 forms a step-down transmission driving a worm shaft 53 on which the worm 19 is mounted. The worm 19 meshes with a worm wheel 54 rotatable about a shaft 55 and carrying a cam 21 engaging a pin 17 on the keeper 12.

The keeper 12 is thus electrically displaceable out of engagement with the rotary bolt 30, allowing the same to rotate.

The inner door handle can be coupled with an actuating lever 14 which, when displaced in the direction of arrow 56 can lift the lever 57 which acts via a coupling lever system 16 and forming part of a second electrically controllable mechanism operated by the setting element 15 to act upon the keeper 12.

The setting element 15 may have an electric motor and step-down transmission 58 driving a pinion 29 on a shaft 59 to swing the gear segment 28 about the pivot 60. The gear segment is formed on the lever 26 to be described in greater detail hereinafter.

By electrical control of the first setting element 13 and the second setting element 15, the lock shown in FIG. 2 can be actuated to obtain functions: "operate", "lock and unlock", "anti-theft security in and out" and "child safety in and out."

It is common to provide all four of the door locks 4 illustrated in FIG. 1 so that they are all identical except for mirror symmetry for the doors on opposite sides or opening in different senses on the same side.

As can be seen from FIG. 2, the keeper 12 can have a first actuating pin 17 which is engaged by a spiral cam 21 on a worm wheel 54 driven by the worm 19 of the motor 18 via its step-down transmission 20 and hence actuated by the setting element 13.

The keeper 12 also has a second actuating pin 22 which can be operated by a release lever 23 swingable about a pivot 62 with an abutment 24. The coupling lever 16 has a coupling pin 25 which can be shifted against the abutment surface 24 of the lever 23. The coupling pin 25 can be displaceable between the functional positions "theft security on" and "theft security off" or "child safety on" and "child safety off." In the positions "theft security off" or "child safety off", the coupling lever 16 has its pin 25 pressed by means of the interior actuating lever 14 against the surface 24 of the release lever 23, swinging the latter in the counterclockwise sense and pressing the pin 22 downwardly to rotate the keeper 12 in the clockwise sense out of engagement of the rotary bolt 30.

In the functional positions "theft security on" or "child safety on", the pin 25 is shifted out of engagement with the abutment surface 24 and the keeper 12 can be braced against the bolt 30 preventing the latter from rotating in the clockwise sense and maintaining the locked state securely.

The coupling lever 16 is pivotally connected to the lever 26 and has another part 27. The part 27 is pivotally connected at 63 to a shank of lever 26 which, as has been previously noted, is formed with the two segments 28 meshing with the drive pinion 29 of the electric motor 58 forming the second setting element 15.

After the central lock system (FIG. 1) has been built into the motor vehicle, a central lock system specific identity code word is permanently stored in the lock identity code word memories 6 as well as in the controller identity code word memory 3 by means of a diagnostic device 11 which can be coupled by a plug 65 to the diagnosis terminal 10 of the vehicle. The device 11 sets the central system specific-identity code word during an initialization of the lock system with the diagnostic device. The latter can be equipped with the usual electronics for monitoring the engine of the vehicle, etc., and the electronic controller 1 may form part of the central computer of the automotive vehicle. The specific-identity code word can be produced by a random generator in the diagnostic device 11.

During operation of the central lock system, the identity code work is repetitively transmitted over the bus 7 between the satellite processors 5 and the central processor 2 back and forth. Thus the satellite processors and the central processor can only dialogue with one another after a transmission of the system-specific identity code word and an identity test or comparison of the transmitted identity code word and the code word permanently stored in the storages 6 and 3 and identity is verified.

Should the identity test fail at any time between a door lock 4 dialoguing with the control device, this door lock and/or the controller 1 is deactivated.

The deactivation is effected by changing over a register 9 of the electronic controller 1 and/or one or more of the satellite processors 5 from an "active" state to an "inactive" state. While all of the registers record "active" states, the ordinary control functions of the central processor 2 and the satellite processors 5 can occur. This means that an input device 66, for example, a code generator with push buttons or a receiver or wave guide unit operating in wireless or infrared communication with a transmitter carried by a user, can actuate the lock system or selected locks thereof.

However, when one of the registers has an "inactive" state recorded therein, the ordinary operation of the lock system and hence the unlocking or control programs of the processors are blocked. With appropriate programming of the satellite processors and/or the central processor, any door lock 4 which before deactivation is not in the functional state "theft security on" is switched into the "theft security on" position.

Upon deactivation, as a result of an identity failure, the electronic control 1 can be programmed to allow resetting of the system identity code word by means of a random generator in the manner described above, anew. The previous identity code word can be extinguished.

The electronic controller can be provided with a theft warning system 67 which, upon registry of an inactive state, can trigger the alarm.

In the event of a theft of the vehicle, during the travel of the stolen vehicle, the central lock system will perform the following functions. To the extent that a door lock built into the vehicle is in the "theft security on" position, it is only deactivated. A reactivation can only be effected by a diagnostic device 11 as has been described. If an authorized person attempts to install a new door lock, this will be recognized as unfamiliar to the family of door locks of the system and the new door lock will be automatically displaced into its "theft security on" function and deactivated. The same will apply in the case of a replacement of the electronic controller 1 by a new electronic controller. In the latter case, the controller 1 will also be deactivated.

If an authorized person then seeks to turn off the alarm, he can do so via a key switch 68 on the electronic controller 1 with a mechanical key 70 or a portable transmitter 69 which, upon receipt of the appropriate signal by the electronic controller will be queried and must respond with a code word stored in the transceiver and matching a code word of the electronic controller 1. The transmitter 69 can then be a transponder or other wireless operator.

In the event of an emergency, the authorized person can insert the key into the key switch and actuate the latter for a certain time period, for example, 300 milliseconds. This can activate the central unit and querying transceiver to inquire as to the code word from the portable unit. Only upon a successful identity comparison of the code word from the portable unit 69 can a reactivation of the door lock by the electronic controller 1 occur.

In this emergency situation, a code comparison in accordance with German Patent 44 28 947 (U.S. application Ser. No. 08/457,730, filed 1 Jun. 1995) can be effected. In such an emergency situation, a door lock which may be provided with the wireless system or a selected door lock controlled by the wireless system associated with the electronic controller may operate.

Of course, in the event of need, the diagnostic device 11 may be available at any authorized service station so that, for example, upon insertion of a new door lock 4 (or controller 1), the controller 1 can be activated or reactivated. At any time when necessary, using the diagnostic device, a new initialization of the central lock system can be effected.

We claim:

1. A centralized lock system for an automotive vehicle having a plurality of lockable doors, said lock system comprising:

a plurality of electrically operated automotive vehicle door locks;

an electronic controller for said locks and including a central processor and a code word storage memory operatively connected to said processor for storing a controller-identity code word;

a respective satellite processor assigned to each of said locks and having a code word storage memory for a respective lock-identity code word;

means for storing in each of said memories a system-specific identity code word specific to the centralized lock system;

a single conductor bus coupling said satellite processors with said central processor and with each other and means for bidirectional multiplexed communicaton between said processors along said single conductor bus for controlling said satellite processors from said central processor and for back and forth transmission of said system-specific identity code word over said conductor between said central and satellite processors for effecting an identity test of a stored system-specific identity code word with a transmitted system-specific identity code word in at least one of said processors; and means at least said one of said processors for deactivating at least one of said electronic controller and of said door locks upon a failure of said identity test.

2. The centralized lock system defined in claim 1 wherein at least one of said door locks has an electrically controlled mechanical theft security device and, upon deactivation, said one of said door locks is shifted by the respective processor into a "theft security on" functional state before the door lock is inactivated.

3. The centralized lock system defined in claim 2 wherein each of said door locks has an electrically controlled mechanical theft security device and, upon deactivation, all of said door locks are shifted by the respective processors into respective "theft security on" functional states before the door locks are inactivated.

4. The centralized lock system defined in claim 3 wherein each of said processors is provided with a respective register capable of registering "active" and "inactive" states and whereby with "active" registered in all of said registers, said central processor effects normal control of said locks but with a changeover of the contents of one of said registers to "inactive" normal lock operation is blocked.

5. The centralized lock system defined in claim 4 wherein, upon failure of said identity test, said system-specific code word is erased.

6. The centralized lock system defined in claim 4 wherein, upon failure of said identity test, said system-specific code word is replaced in said memories by a new system specific code word supplied by a random code word generator.

7. The centralized lock system defined in claim 4 wherein said means for storing in each of said memories a system-specific identity code word specific to the centralized lock system includes a diagnostic device connectable to said controller by a diagnosis terminal, said system-specific identity code word being programmable in said diagnostic device.

8. The centralized lock system defined in claim 1 wherein each of said door locks has an electrically controlled mechanical theft security device and, upon deactivation, all of said door locks are shifted by the respective processors into respective "theft security on" functional states before the door locks are inactivated.

9. The centralized lock system defined in claim 1 wherein each of said processors is provided with a respective register capable of registering "active" and "inactive" states and whereby with "active" registered in all of said registers, said central processor effects normal control of said locks but with a changeover of the contents of one of said registers to "inactive" normal lock operation is blocked.

10. The centralized lock system defined in claim 1 wherein, upon failure of said identity test, said system-specific code word is erased.

11. The centralized lock system defined in claim 1 wherein, upon failure of said identity test, said system-specific code word is replaced in said memories by a new system specific code word supplied by a random code word generator.

12. The centralized lock system defined in claim 1 wherein said means for storing in each of said memories a system-specific identity code word specific to the centralized lock system includes a diagnostic device connectable to said controller by a diagnosis terminal, said system-specific identity code word being programmable in said diagnostic device.

13. A method of operating a centralized lock system for an automotive vehicle in which the vehicle is provided with a plurality of lockable doors, and the lock system has a plurality of electrically operated automotive vehicle door locks, an electronic controller for said locks and including a central processor and a code word storage memory operatively connected to said processor, a respective satellite processor assigned to each of said locks and having a code word storage memory, and at least one electrical control conductor coupling said satellite processors with said central processor for controlling said satellite processors from said central processor, said method comprising the steps of:

(a) storing in each of said memories a system-specific identity code word specific to the centralized lock system by a diagnostic device;

(b) repetitively transmitting said system-specific identity code word over said line between said satellite processors and said central processor;

(c) effecting an identity test of a stored system-specific identity code word with a transmitted system-specific identity code word in at least one of said processors; and (d) deactivating at least one of said electronic controller and of said door locks upon a failure of said identity test, each of said door locks having an electrically controlled mechanical theft security device, upon deactivation, all of said door locks are shifted by the respective processors into respective "theft security on" functional states before the door locks are inactivated.

14. The method defined in claim 13 wherein the repetitive transmission of said system-specific identity code words over said line is effected upon an addition of a door lock or a controller to said system.

15. The method defined in claim 13 wherein the door locks are deactivated upon energization of a theft-warning system connected to said central processor.

16. The method defined in claim 13 wherein upon failure of said identity test, said system-specific code word is erased.

17. The method defined in claim 13 wherein, upon failure of said identity test, said system-specific code word is replaced in said memories by a new system specific code word supplied by a random code word generator.

18. The method defined in claim 13 wherein each of said processors is provided with a respective register capable of registering "active" and "inactive" states and whereby with "active" registered in all of said registers, said central processor effects normal control of said locks but with a changeover of the contents of one of said registers to "inactive," normal lock operation is blocked.

* * * * *